United States Patent [19]

Ludwig

[11] 4,310,142
[45] Jan. 12, 1982

[54] FUEL PRESSURE REGULATOR ASSEMBLY

[75] Inventor: George C. Ludwig, Florence, S.C.

[73] Assignee: Tom McGuane Industries, Inc., Madison Heights, Mich.

[21] Appl. No.: 130,082

[22] Filed: Mar. 13, 1980

[51] Int. Cl.³ .............................................. F16K 31/12
[52] U.S. Cl. ..................................... 251/30; 137/238; 137/549; 251/45
[58] Field of Search .................... 251/45, 30; 137/510, 137/505.25, 549, 238, 510

[56] References Cited

U.S. PATENT DOCUMENTS

| | | | |
|---|---|---|---|
| 2,888,949 | 6/1959 | Evans | 137/505.25 |
| 2,935,083 | 5/1960 | Singer | 137/505.25 |
| 3,155,366 | 11/1964 | Rasmussen | 137/510 X |
| 3,749,176 | 7/1973 | Grenier | 251/45 X |
| 3,872,878 | 3/1975 | Kozel | 251/45 X |
| 3,904,168 | 9/1975 | Marocco | 251/45 X |
| 4,099,701 | 7/1978 | Berger | 251/45 X |
| 4,130,267 | 12/1978 | Iuada | 137/510 X |
| 4,169,489 | 10/1979 | Iuada | 137/549 X |
| 4,204,561 | 5/1980 | Ludwig | 137/510 |

Primary Examiner—Harold W. Weakley
Attorney, Agent, or Firm—Barnes, Kisselle, Raisch & Choate

[57] ABSTRACT

A fuel pressure regulator assembly comprising a housing, a diaphragm separating the housing into a first and second chamber. The housing has a radial inlet extending to the first chamber and a connector having an axial outlet is mounted in the housing and extends axially into the first chamber. The connector supports a sealing ring. The diaphragm supports a valve member that is adapted to engage the sealing ring, and a spring in the second chamber urges said valve member against the sealing ring. The fuel pressure regulator assembly includes provision for increasing the fuel regulation pressure by varying the effective diaphragm area.

3 Claims, 10 Drawing Figures

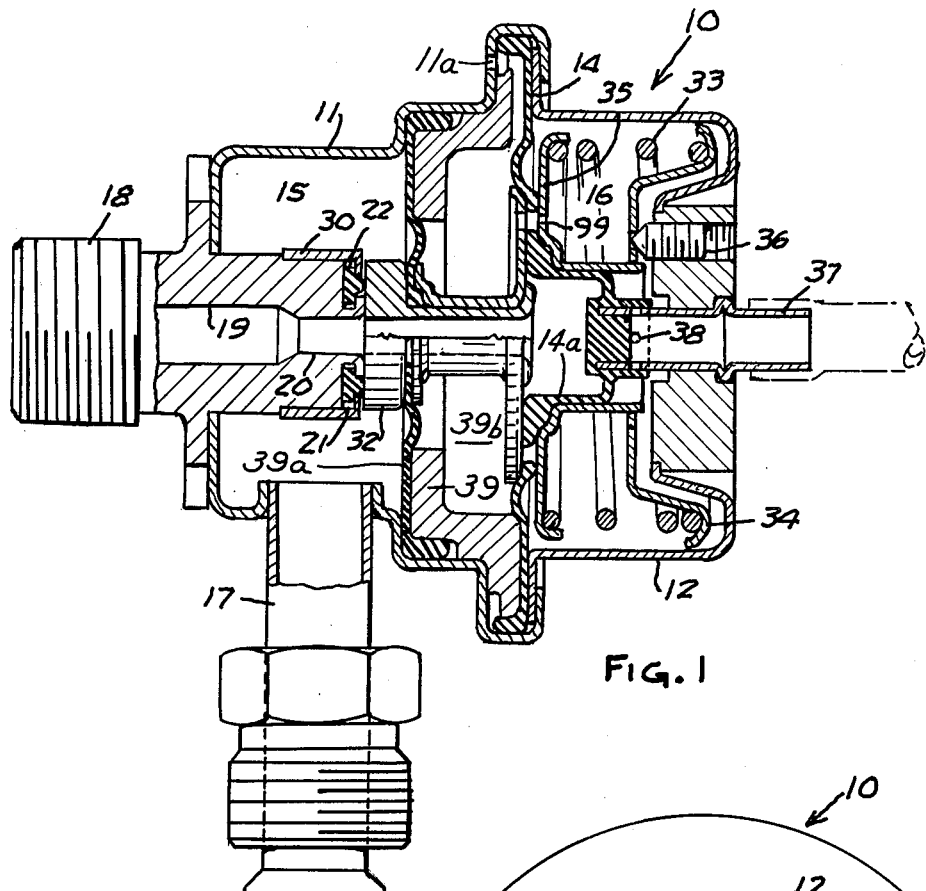
FIG. 1
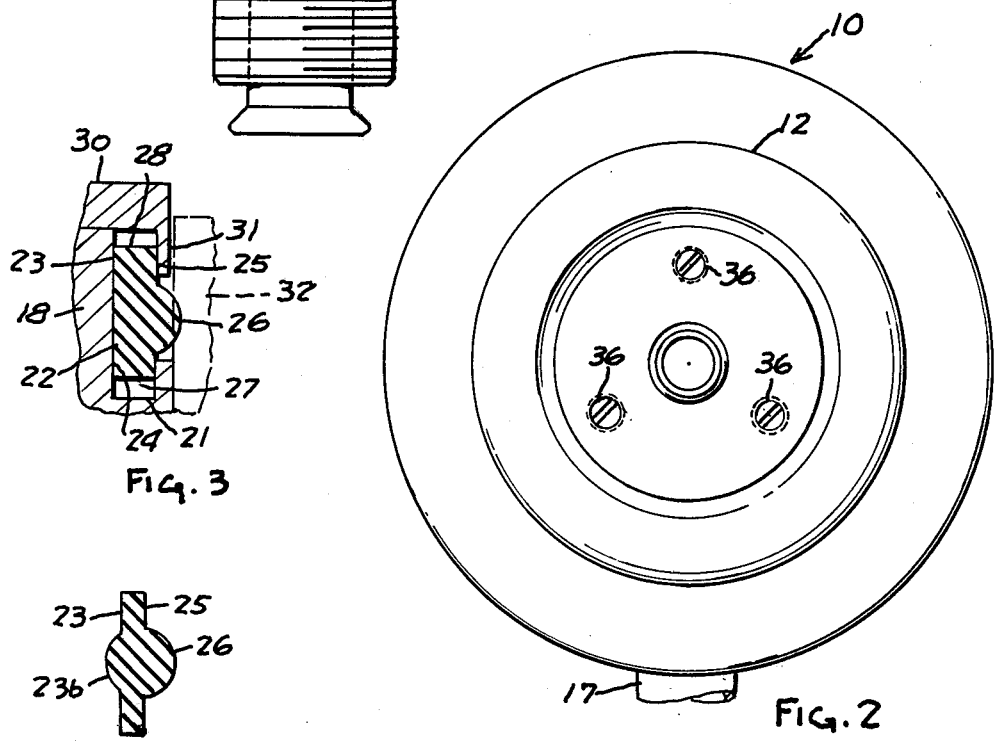
FIG. 3
FIG. 4
FIG. 2

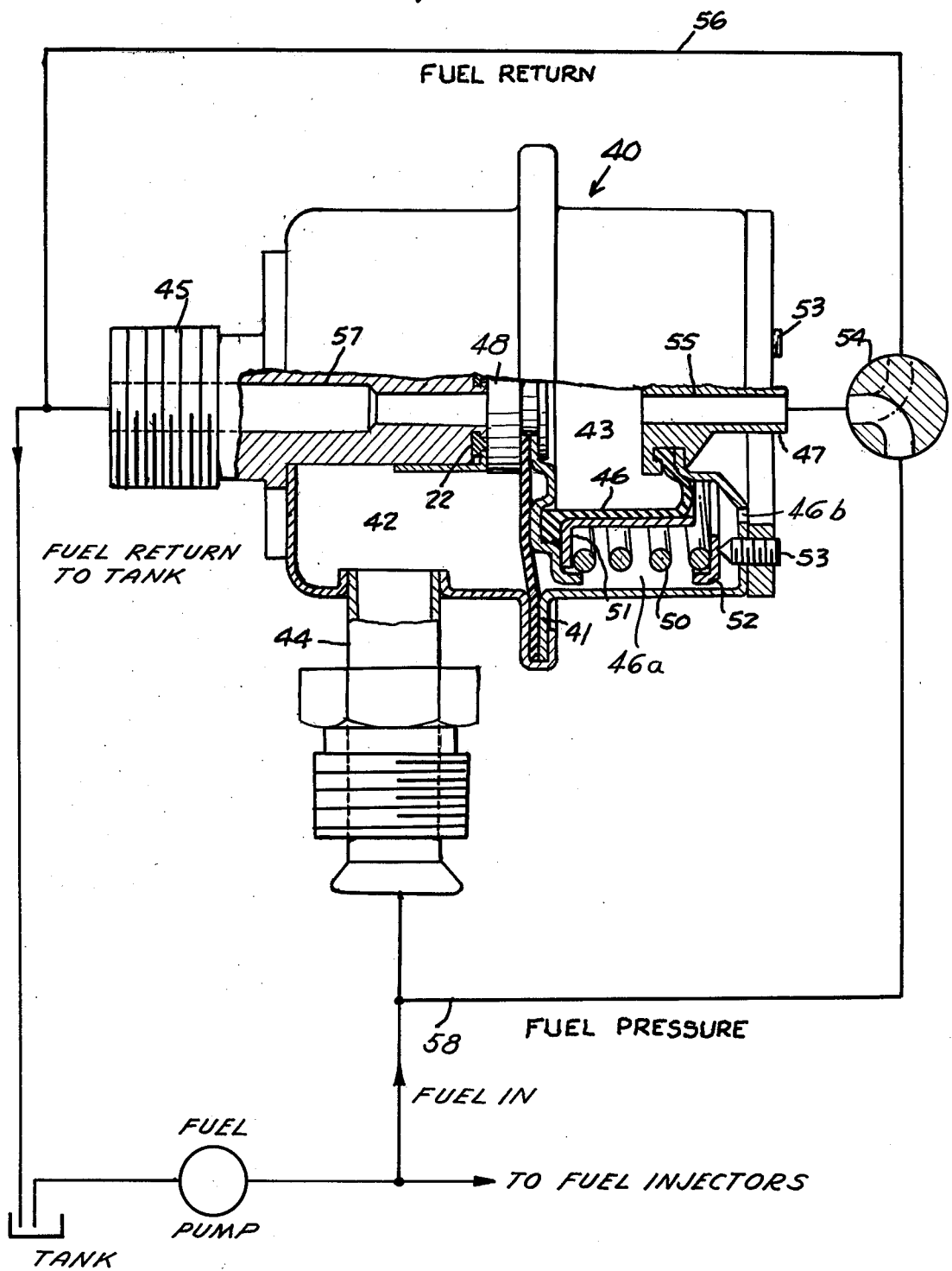

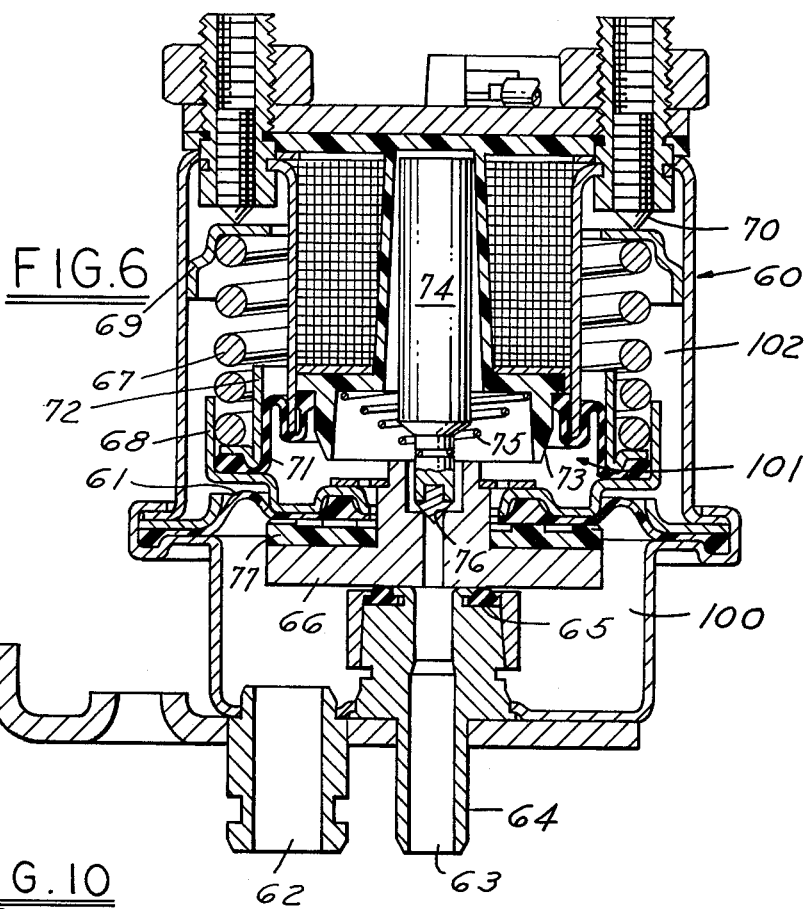
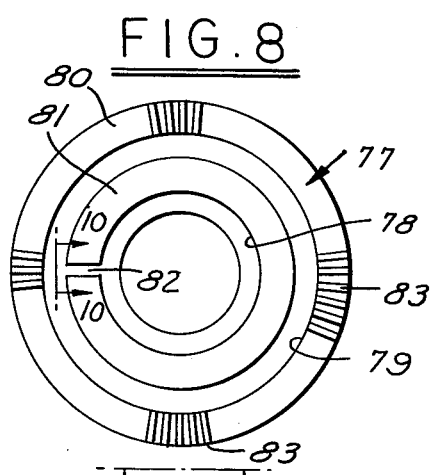
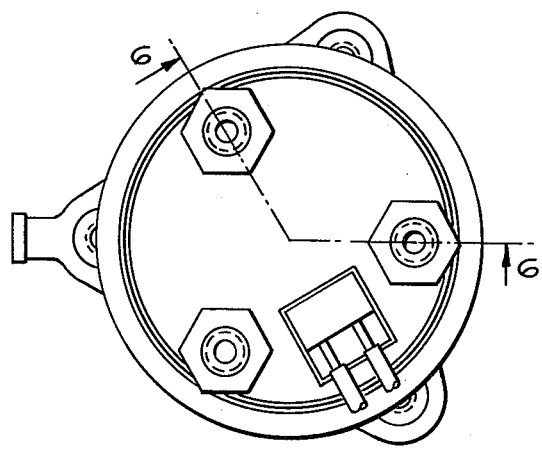
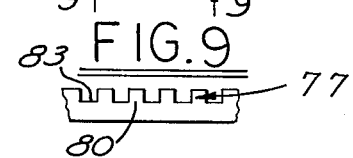

FUEL PRESSURE REGULATOR ASSEMBLY

This invention relates to fuel pressure regulator assemblies.

BACKGROUND AND SUMMARY OF THE INVENTION

In connection with the accurate control of fuels for internal combustion engines utilized in automobiles, it has become a common practice to utilize a fuel pressure regulator assembly. Such a device commonly includes a spring loaded diaphragm which functions against a flat surface in a metal-to-metal contact to control the pressure of the fuel that is permitted to flow to the system.

In such a device, it is important to have an accurate control as well as a positive shut-off when the pressure is insufficient.

Accordingly, the present invention is directed to a fuel pressure regulator assembly incorporating improved construction for controlling and shutting of the flow of fuel.

In copending U.S. application Ser. No. 880,782 filed Feb. 24, 1978, now U.S. Pat. No. 4,204,561, the fuel pressure regulator assembly comprises a housing and diaphragm separating said housing into a first and second chamber. The housing has a radial inlet extending to the first chamber and a connector having an axial outlet is mounted in the housing and extends axially into the first chamber. The connector supports a sealing ring in a groove. The diaphragm supports a valve member that is adapted to engage the sealing ring, and a spring in the second chamber urges the valve member against said sealing ring.

Among the objectives of the present invention are to provide a fuel pressure regulator assembly having novel means for insuring accurate and positive shut-off of the fuel pressure; having a novel sealing ring; and having provision for varying the pressure of the fuel as may be required in use, for example, for boosting the fuel pressure in a turbo supercharged engine.

DESCRIPTION OF THE DRAWINGS

FIG. 1 is a part sectional view of a fuel pressure regulator assembly embodying the invention;

FIG. 2 is an end view from the right in FIG. 1;

FIG. 3 is a fragmentary sectional view on an enlarged scale of a portion of the sealing ring of the fuel pressure regulator assembly shown in FIG. 1;

FIG. 4 is a fragmentary sectional view of a modified form of sealing ring;

FIG. 5 is a fragmentary sectional view of a portion of a modified form of fuel regulator assembly; and FIG. 6 is a fragmentary sectional view of another modified form of fuel regulator assembly taken along the line 6—6 in FIG. 7.

FIG. 7 is a plan view of the modified form of fuel pressure regulator assembly shown in FIG. 6.

FIG. 8 is a plan view of a portion of the fuel pressure regulator assembly shown in FIG. 6.

FIG. 9 is a fragmentary sectional view taken along the line 9—9 in FIG. 8.

FIG. 10 is a fragmentary sectional view taken along the line 10—10 in FIG. 8.

DESCRIPTION

Referring to FIG. 1, the fuel pressure regulator assembly embodying the invention comprises a housing 10 including two housing parts 11, 12 joined together by crimping part 11 over part 12 which also crimps and holds diaphragms 14 dividing the housing into a first chamber 15 and a second chamber 16. An insert 39 holds a second diaphragm 39a in housing part 11. Insert 39 is clamped in position by the crimping together of parts 11, 12. A third chamber 39b is thereby formed which is vented to the ambient through vent orifice 11a. A fuel inlet 17, in the form of a pipe, extends to the first chamber 15 for providing fuel to the chamber 15. A connector 18 is provided in the housing part 11 and extends axially and includes an axial opening 19 defining an outlet.

The end 20 of the connector 18 has a reduced cross section and has an annular groove 21 that receives a sealing ring 22.

As shown in FIG. 3, sealing ring 22 is in the form of a generally flat resilient body having a generally rectangular cross section with a flat surface 23 engaging a complementary flat surface 24 on the connector 18, an opposing flat surface 25 having an arcuate annular portion 26 projecting axially and inner and outer annular surfaces 27, 28 respectively.

In the form of sealing ring shown in FIG. 4, the surface 23 of the sealing ring is formed with an annular convex rib 23b to increase the sealing engagement with the surface 24.

A generally cylindrical retainer 30 has a friction or interference fit with the periphery of the cylindrical exterior of the connector 18 and includes an annular rim 31 at the outer end having a radially and axially inwardly directed inner surface that engages surface 25 to facilitate retention of the sealing ring 22 on the end of the connector 18.

The diaphragms 14, 39a support a valve 32 which has a flat radial surface that is adapted to contact the sealing ring. A coil spring 33 is interposed between a guide member 34 and a washer 35 to yieldingly urge the diaphragms and in turn the valve 32 against the sealing ring 22. Circumferentially spaced screws 36 are threaded into a fitting in the housing part 12 and engage the guide member 34 so that the tension of the spring 33 on the diaphragm can be adjusted.

A vent passage 11a vents chamber 39b to the atmosphere. An orifice 99 provides communication between chambers 16 and 39b.

Functionally the regulator controls fuel pressure by opening valve 32 and providing a passage to return port 19, thereby reducing the fuel pressure. Opening of valve 32 is dependent upon the summation of forces action upon the valve 32. Following is a force summation:

1. Fuel pressure acting on diaphragm 39a. Force to the right.
2. Spring 33 Force to the left.
3. Bias pressure force acting on diaphragm 14. Force to the left.

Diaphragm 14 is provided to increase fuel pressure as a function of intake manifold boost pressure, which is applied to port 37. A portion of diaphragm 14 cooperates with openings 38 to define a check valve which allows only pressure and not manifold vacuum to act on diaphragm 14. Orifice 99 and vent holes 52 allow the pressure in chamber 16 to reduce to atmospheric upon removal of pressure to port 37. The second convolution in diaphragm 14, namely 14a, provides an area equal to the valve area created by seal 26. This provides a balanced poppet action of said valve 32, which is unaffected by variations of return pressure in port 19. In use, fuel enters through a pipe 17 into chamber 15 and if the pressure of the fuel is sufficient, the diaphragm 39a is moved outwardly in turn moving the valve 32 away from the sealing ring 22 and permitting the fuel to flow axially outwardly through the opening 19. When the fuel pressure is insufficient, the diaphragm 39a is moved axially bringing the valve 32 into engagement with the sealing ring and positively cutting off the fuel without leakage.

The screws 36 are equidistantly spaced about the center of the regulator, that is, 120 degrees apart. As a result the end of the spring 33 may be adjusted to insure equal and positive engagement of the valve 32 with the sealing ring 22. More specifically, the end the spring 33 engages the guide member 34 defines a plane with three degrees of freedom. The plane may be rotated on two axes and translated on one axis.

As further shown in FIG. 1, the force of the spring 33 may be further modified by manifold pressure through an inlet pipe 37 that is connected to manifold pressure and applies that pressure to the chamber 16 through openings 38 in the pipe. The manifold pressure thus further serves to modify the force of the spring.

In the form of the invention shown in FIG. 5, the housing 40 is divided by diaphragms 41 into chambers 42, 43 and has an inlet for fuel as at 44 and an outlet as at 45, as in he previous form of the invention. A second diaphragm 46 is provided to isolate chamber 43 and define a chamber 46a. Diaphragm 46 engages a connector 47. The diaphragm 41 supports the valve 48 which engages the seal 49 on the connector 45. A spring 50 is interposed between a washer 51 engaging the diaphragm and a guide member 52 that is once again positioned by equidistantly and circumferentially spaced screws 53.

In this form of the invention, a directional valve 54 controls communication of the passage 55 either to a line 56 extending to the passage 57 of connector 45 or through a line 58 to the inlet 44.

When the three-way valve 54 is in the broken line position shown in FIG. 5, the diaphragm 41 has fuel pressure on one side providing an opening force to valve 48. The back side of diaphragm 41 is subjected to atmospheric pressure since chamber 46a is vented through a vent 46b and fuel return pressure is atmospheric in the fuel tank. As a result, the output pressure acting on diaphragm 41 will be limited by the force of spring 50. When fuel pressure acting on diaphragm 41 exceeds the force of spring 50, valve 48 opens a flow path back to the tank reducing fuel pressure. Placing valve 54 in the position shown, reduces the effective area of diaphragm 41 since the center portion, which is circumscribed by diaphragm 46 has a balance of fuel pressure on both sides. Only the remaining portion of diaphragm 41 area exposed to chamber 46a is effective in providing a force to over come the force of spring 50. Therefore, a higher fuel pressure is required to open valve 48.

It can thus be seen that there has been provided a system for increasing the fuel pressure regulator capacity. In practice the control of the three-way valve may be by some device on the vehicle such as a computer.

In the form of fuel pressure regulator assembly shown in FIG. 6-10, the housing 60 is divided into two chambers 100, 102 by diaphragm 61 and has a fuel inlet 62 and a fuel outlet 63. The latter forms a part of a connector 64 having a sealing ring 65 on which a valve 66 is urged by a spring 67 engaging a washer 68 and guide 69. Guide 69 is adjusted in its position by equidistantly spaced screws 70, as in the previous forms of the invention.

As in the form of the invention shown in FIG. 6, a second diaphragm 71 is provided between the washer 68 and another washer 72 and seals against an electromagnet 73. The electromagnet includes an armature 74 that is yieldingly urged by a spring 75 against the opening of a passage way 76 in the valve 66. The assembly further includes a filter 77 interposed between the diaphragm 61 and valve 66 for purposes presently described.

Filter 77 comprises a plastic part having a first inner annular groove 78 and a second intermediate annular groove 79 defining rectangular annular rings 80, 81 against which diaphragm 61 seals. Ring 80 includes radial slots 83. In use, when the solenoid is deenergized, there will be no flow but turbulence within the valve will clean the filter by flow through and about the slots 83.

I claim:

1. A fuel pressure regulator assembly comprising
   a housing,
   a first diaphragm separating said housing into a first and second chamber,
   said housing having a fuel inlet extending to said first chamber,
   a connector mounted in said housing and extending axially into said first chamber,
   said connector having an axial fuel outlet,
   a sealing ring of resilient material,
   interengaging means between said sealing ring and said connector for mounting said sealing ring on said connector such that a portion of said sealing ring projects axially beyond said connector,
   said first diaphragm having a valve member adapted to engage said sealing ring,
   and spring means in said second chamber urging said valve member against said sealing ring,
   a second diaphragm defining a third chamber between said first and second chambers,
   said second diaphragm being movable with said valve member,
   said valve member having an opening therethrough providing communication between said first chamber and said third chamber,
   a solenoid in said second chamber of said housing having a plunger extending into said third chamber and operable to control the axial opening in said valve member.

2. The fuel pressure regulator set forth in claim 1 including a fuel filter associated with said first diaphragm and said first chamber and cleaned by turbulence when said sealing ring is in engagement with said valve member to prevent fuel flow to said first chamber.

3. The fuel pressure regulator assembly set forth in claim 2 wherein said fuel filter comprises a member associated with the said first diaphragm and comprising spaced grooves defining spaced rings adapted to engage said second diaphragm and radial slots in said rings adjacent said first diaphragm.

* * * * *